M. J. HUGGINS.
AUTOMOBILE.
APPLICATION FILED MAR. 27, 1916.
1,293,100. Patented Feb. 4, 1919.
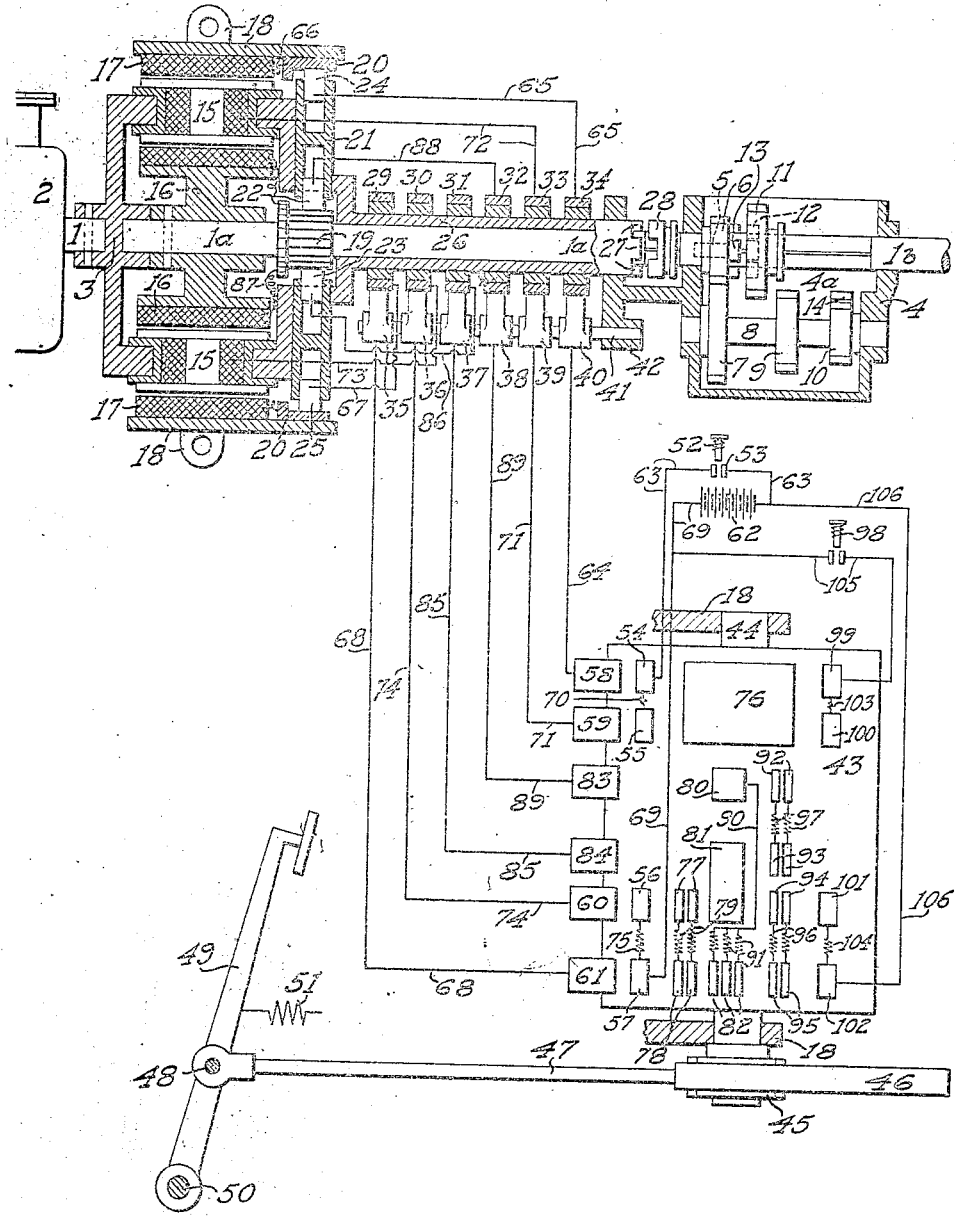

UNITED STATES PATENT OFFICE.

MERION J. HUGGINS, OF NEW YORK, N. Y.

AUTOMOBILE.

1,293,100. Specification of Letters Patent. Patented Feb. 4, 1919.

Application filed March 27, 1916. Serial No. 87,128.

*To all whom it may concern:*

Be it known that I, MERION J. HUGGINS, a citizen of the United States, and resident of the city of New York, in the county of Kings and State of New York, have invented certain new and useful Improvements in Automobiles, of which the following is a specification.

This invention relates to automobiles, and particularly to the driving and speed controlling mechanism thereof, and its principal object is to provide simple, efficient, reliable, and improved means for driving the automobile at a great range of variable speeds, and for controlling its speeds with ease, convenience, and flexibility, and without causing any jar to the automobile or its occupants.

Other objects and advantages will hereinafter appear.

The accompanying drawing shows a general sectional plan view of the driving and speed controlling mechanism of the automobile, and a diagram of the circuits for operating the mechanism.

A drive-shaft 1 rotated by an oil engine 2 is split from a continuing shaft-section $1^a$ thereof at 3 and extends to and passes through a casing 4 that contains suitable variable speed mechanism $4^a$. The shaft-section $1^a$ is split from a continuing shaft-section $1^b$ thereof at 5 and carries a gear 6 of said variable speed mechanism that meshes with a gear 7 keyed upon a rotatable countershaft 8. Said countershaft carries drive-gears 9, 10, and a coöperating gear 11 is splined upon shaft-section $1^b$, wherewith different speeds may be imparted to this shaft-section for driving the automobile-wheels, not shown. Thus, when the gear 11 is disposed in the neutral position shown, the gear 6 meshing with the gear 7 drives the countershaft 8 idly and no motion is imparted to the shaft-section $1^b$, and when the gear 11 is shifted to engage an internal coupling member 12 thereof with a coupling-member 13 forming part of the gear 6, the shaft-sections $1^a$, $1^b$, become coupled and the latter is driven at high speed directly from the former. Shifting of the gear 11 to mesh it with the gear 9 drives the shaft-section $1^b$ at lower or intermediate speed, and shifting the gear 11 to mesh it with an idler gear 14 that in turn meshes with drive gear 10 causes said shaft-section to rotate in an opposite direction for reversing the automobile-wheels. To the drive shaft 1 is secured a generator field-element 15, and within said field is located a generator-armature 16 which is fixed to the shaft-section $1^a$. At the exterior of the field 15, and concentrically with said drive shaft, is located a stationary generator-armature 17 which is secured to the frame-work 18 of the automobile. A rotatable commutator 19 for the armature 16 is keyed to the shaft-section $1^a$, and a commutator 20 for the armature 17 is secured to the frame-work 18. Frames 21 fixed to the field 15 carry brushes 22, 23 that are in contact with commutator 19, and brushes 24, 25 that are in contact with the commutator 20. A sleeve 26 forming part of the field 15 and surrounding the shaft-section $1^a$ is provided at its extremity with a coupling-member 27, and a coöperating coupling-member 28 splined upon said shaft-section may be shifted to engage with and disengage from the member 27, whereby the field 15 with its sleeve 26 may be locked to or unlocked from the shaft-section $1^a$. The sleeve 26 carries contact rings 29, 30, 31, 32, 33, and 34, with which coöperate collector-brushes 35, 36, 37, 38, 39, and 40 respectively that are secured upon a bar 41 fixed to a bracket 42 extending from the casing 4.

Operating devices for the driving and speed controlling mechanism comprise suitable circuit controlling means consisting conveniently of a rotatable drum 43, keyed upon a shaft 44, which is journaled in the frame-work 18 of the automobile. The shaft 44 carries a gear 45 which meshes with a rack 46 that is drawn by a rod 47 pivoted at 48 to a pedal 49. Said pedal is fulcrumed at 50 to the automobile frame-work and is normally swung toward the right, as viewed in the drawing, by a spring 51, whereby pressing of said pedal contrary to spring 51 rotates the drum 43, and releasing of the pedal causes said spring to restore it and rotate said drum backwardly to initial position.

Assuming that the entire mechanism is at rest and it is desired to start the automobile, the operator may depress a switch 52, or other suitable circuit controlling means, to join contacts 53, and then place his foot upon pedal 49 to therewith rotate the drum 43 partially and bring contact plates 54, 55, 56, 57 in contact with terminal contacts 58, 59, 60 and 61 respectively. This conducts current from battery 62 along wire 63, contacts 54, 58, wire 64, brush 40, ring 34, wire 65, brush 24, commutator 20, wire 66, armature 17, brush 25, wire 67, ring 29, brush 35, wire 68, contacts 61, 57, and wire 69 back to the battery; and simultaneously current is conducted along a branch circuit from contact 54, along resistance 70, contacts 55, 59, wire 71, brush 39, ring 33, wire 72, field 15, wire 73, ring 30, brush 36, wire 74, contacts 60, 56, resistance 75, and through contact 57 and wire 69 back to the battery. The armature 17 and the field 15 are thereby energized and the field is rotated to drive the shaft 1 and start the engine 2. When the engine is started running, the switch 52 may be released and the circuit broken thereat, and the pedal 49 may be pressed farther forward to bring contact plate 76 in contact with terminal contacts 58, 59, and contact plates 77, 78 in contact with terminal contacts 60, 61, whereupon the engine 2 rotates the field 15 to generate current in conjunction with the stationary armature 17, which current is conducted from said armature along brush 24, wire 65, ring 34, brush 40, contacts 58, 76, 59, wire 71, brush 39, ring 33, wire 72, field coils 15, wire 73, ring 30, brush 36, wire 74, contact 60, any one of plates 77, across one of the variable resistances 79, along one of the connecting contacts 78, contact 61, wire 68, brush 35, ring 29, wire 67, and through the brush 25 back to armature 17. The resistance 79 that first approaches the contacts 60, 61 is greater than its adjacent resistance, and the effect of contacting successively with the plates 77, 78 and directing the current through these variable resistances successively is to cause a gradual building up of the current during its initial generation right after the engine has been started running. In order to start the automobile running the pedal 49 is pressed farther forward and the contact-plate 76 and contact-plates 80, 81, 82 are thereby caused to contact with terminal contacts 58, 59, 83, 84, 60, 61 respectively, whereby the current is conducted from armature 17 along brush 24, wire 65, ring 34, brush 40, wire 64, contact 58, plate 76, contact 59, wire 71, brush 39, ring 33, wire 72, field 15, wire 73, ring 30, brush 36, wire 74, contact 60, plate 81, contact 84, a wire 85, brush 37, ring 31, a wire 86, brush 23, commutator 19, a wire 87, armature 16, brush 22, a wire 88, ring 32, brush 38, a wire 89, contact 83, plate 80, a conducting wire 90, one of variable resistances 91, any one of plates 82, contact 61, wire 68, brush 35, ring 29, wire 67, and through the brush 25 back to the armature 17. The generating elements 17, 15, 16 thus become connected in series and while so connected the rotation of the field 15 causes generation of current in the stationary armature 17, energizing of the field 15, and generation of current in the rotatable armature 16 by its coaction with the field. This coaction of armature 16 with the rotating field generates electro-magnetic flux between them, whereby as the field rotates it drags the armature 16 along therewith electromagnetically and produces rotation thereof and of drive-shaft section 1ª, which in turn transmits rotation to the automobile wheels. As the intensity of the electromagnetic flux between the elements 15, 16 increases, with the increase of speed of field 15, the electric drag and torque between them increases, and consequently the slippage between these elements, or the speed of field 15 relatively to the speed of driven armature 16, decreases in a manner that tends to generate less current in the armature 16, and in order to avoid loss of torque between these elements, that would result from the said reduction of current generation, the current flowing from armature 17 is fed through the armature 16, in the seriesing of the three elements, and operates to intensify the electromagnetic flux and to thereby maintain or increase the electric drag and torque between the elements 15, 16. The resistances 91 decrease in the order in which they approach the contacts 60, 61, and therefore the effect of contacting of the various plates 82 with said contacts, by operation of pedal 49, and directing the current to flow through these variable resistances and through the seriesed three generator elements 17, 15, 16 is to increase and decrease the current generation, to regulate the intensity of the electromagnetic drag and torque between the elements 15, 16, and to drive the armature 16 at variable speed to impart various speeds to the automobile. To secure further regulation of torque or intensity of electromagnetic drag between the elements 15, 16, the pedal 49 may be pressed farther to bring plate 76 and contact-plates 92, 93, 94, 95 in contact with the terminal-contacts 58, 59, 83, 84, 60, 61. The current is thereby conducted from armature 17 along brush 24, wire 65, ring 34, brush 40, wire 64, contact 58, plate 76, contact 59, wire 71, brush 39, ring 33, wire 72, field 15, wire 73, ring 30, brush 36, wire 74, contact 60, any one of plates 94, any one of variable resistances 96, any one of plates 95, contact 61, wire 68, brush 35, ring 29, wire 67, and brush 25 back to the armature 17; and the current generated in armature 16 is conducted in a short circuit from brush 22 along wire 88, ring 32, brush 38, wire 89, contact 83, any one of plates 92, any one of variable resistances 97, any one of plates 93, contact 84, wire 85, brush 37, ring 31, wire 86, and through brush 23 back to the armature. In this operation of the generator elements the field 15 is maintained in energized state by its coaction with the stationary armature 17, and the current in the driven armature 16 flowing in short circuit is generated by coaction of this armature with said field. Said short-circuiting of the armature 16, and the coincident regulation of the generation and the flow of current through the generator elements is productive of additional large range of variation of speed of the driven armature 16 and the drive-shaft section 1ᵃ. When the armature 16 has acquired its full speed, which is nearly like that of the field 15, the coupling member 28 may be shifted toward the left, as viewed in the drawing, and caused to engage the sleeve 26, whereupon the generator-elements 15, 16, as well as the shaft-sections 1, 1ᵃ become mechanically coupled and the drive-shaft section 1ᵃ is driven directly from the engine 2. The pedal 49 may be then released, the circuits broken, and the automobile continued to be driven directly from the engine until it is again desired to drive it at variable speeds through electrical flexible control, when the coupling members 27, 28 may be disengaged and the pedal 49 again manipulated to drive the automobile through the operation of the generator elements 17, 15, 16.

It will be evident that whether the drive-shaft section 1ᵃ is driven directly from the engine 2, by coupling of the members 27, 28, or through the medium of the electric generator, its continuing shaft section 1ᵇ that drives the automobile wheels may be driven either directly therefrom, by coupling the members 12, 13, or it may be driven through the gears of the variable speed mechanism 4ᵃ. In this manner ready and convenient changing of speed may be performed whether driving from the engine or through the operation of the generator, whereby greater range of speed variation may be thus further secured to meet various changing road conditions or various driving exigencies.

While the automobile is being driven directly from the engine 2, by the mechanical coupling of the generator-elements 15, 16, and the shaft sections 1, 1ᵃ, current may be generated by the coaction of the relatively driven elements 17, 15 to charge battery 62. In order to charge said battery a switch 98 is closed and the pedal 49 is pressed to bring contact-plates 99, 100, 101 and 102 in contact with terminal contacts 58, 59, 60, 61 respectively, whereby current is conducted from armature 17, along brush 24, wire 65, ring 34, brush 40, wire 64, contact 58, plate 99, resistance 103, plate 100, contact 59, wire 71, brush 39, ring 33, wire 72, field 15, wire 73, ring 30, brush 36, wire 74, contact 60, plate 101, resistance 104, plate 102, contact 61, wire 68, ring 29, brush 35, wire 67, and through the brush 25 back to the armature 17, and current is conducted to charge the battery along a branch circuit leading from plate 99, along wire 105, wire 69, through the battery 62, and along a wire 106 to plate 102.

It will be evident that all of the above described operations of the driving and speed controlling mechanism can be performed readily, rapidly and conveniently by the mere operation of the foot-pedal 49.

Variations may be resorted to within the scope of the invention, and portions of the improvements may be used without others.

Having thus described my invention, I claim:—

1. In an automobile, the combination with a prime mover, of a generator having three elements, two of said elements being relatively driven by said prime mover to generate current, the third element being driven by the electric drag produced between it and said relatively driven elements to drive the automobile, a circuit connecting said relatively driven elements, and a closed circuit for said third element.

2. In an automobile, the combination with a prime mover, of a generator having three elements, two of said elements being relatively driven by said prime mover to generate current, the third element being driven by the electric drag produced between it and said relatively driven elements to drive the automobile, a circuit connecting said relatively driven elements, a closed circuit for said third element, and a closer for said former circuit coöperating with variable resistances to regulate the speed of said third element.

3. In an automobile, the combination with a prime mover, of a generator having three elements, two of said elements being relatively driven by said prime mover to generate current, the third element being driven by the electric drag produced between it and said relatively driven elements to drive the automobile, a circuit connecting said three elements in series, and means to short circuit said third element.

4. In an automobile, the combination with a prime mover, of a generator having three elements, two of said elements being relatively driven by said prime mover to generate current, the third element being driven by the electric drag produced between it and said relatively driven elements to drive the automobile, a circuit connecting said three elements in series, means to short circuit said third element, and a closer for said circuit coöperating with variable resistances to regulate the speed of said third element.

5. In an automobile, the combination with a prime mover, of a generator having three elements, two of said elements being relatively driven by said prime mover to generate current, the third element being driven by the electric drag produced between it and said relatively driven elements to drive the automobile, a circuit connecting said three elements in series, means to short circuit said third element, variable resistances for said means, variable resistances for said circuits, and circuit closing means coöperating with said resistances to regulate the speed of said third element.

6. In an automobile, the combination with a prime mover, of a generator having three elements, two of said elements being relatively driven by said prime mover to generate current, the third element being driven by the electric drag produced between it and said relatively driven elements to drive the automobile, a circuit connecting said three elements in series, means to short circuit said third element, variable resistances for said means, and circuit closing means coöperating with said resistances to regulate the speed of said third element.

7. In an automobile, the combination with a prime mover, of a generator having three elements, two of said elements being relatively driven by said prime mover to generate current, the third element being driven by the electric drag produced between it and said relatively driven elements to drive the automobile, a battery, a circuit connecting said battery with said relatively driven elements, and means to feed current from generating coils of said battery to said connected elements to drive these elements relatively for operating said prime mover.

8. In an automobile, the combination with a prime mover, of a generator having three elements, two of said elements being relatively driven by said prime mover to generate current, the third element being driven by the electric drag produced between it and said relatively driven elements to drive the automobile, a battery, a circuit connecting said battery with said relatively driven elements, and means to charge said battery with current generated in coils of said relatively driven elements employed in the driving operation.

9. In an automobile, the combination with a prime mover, of a generator having three elements, two of said elements being relatively driven by said prime mover to generate current, the third element being driven by the electric drag produced between it and said relatively driven elements to drive the automobile, a battery, a circuit connecting said battery with said relatively driven elements, means to feed current from said battery to said connected elements to drive these elements relatively for operating said prime mover, and means to charge said battery with current generated in coils of said relatively driven elements employed in the driving operation.

10. In an automobile, the combination with a prime mover, and a drive shaft, of a generator having two armature elements and a field element, said field and one of said armatures being relatively driven by said prime mover to generate current, the other of said armatures being driven by the electric drag produced between it and said relatively driven elements to drive said shaft, a circuit connecting said three elements in series, and means to short circuit said latter armature.

11. In an automobile, the combination with a prime mover, and a drive shaft, of an electric current generator having two armature structures with windings and one field structure with windings common to both said armatures, said field structure and one of said armatures being relatively driven by said prime mover to generate current, the other of said armatures being driven by the electro-magnetic drag produced by the generation of current therein through its coaction with said relatively driven elements, to drive said shaft.

12. In an automobile, the combination with a prime mover, of an electric current generator having a fixed element, a driving rotatable element and a driven rotatable element, the driving rotatable element being driven by the prime mover to generate current through co-acting with said fixed element and to generate current through co-acting with the driven rotatable element to drive the driven element by the electro-magnetic drag produced through the generation of said current, and by a magnetic flux intensified by operation of the current generated through co-action with the fixed element.

13. In an automobile, the combination with a prime mover, of an electric current generator having an exterior fixed armature structure with windings, a concentric rotatable field structure with windings located within said armature and a concentric rotatable armature structure with windings located within said field structure, said field structure being driven by the prime mover to generate current through coaction with said fixed armature structure and to generate current through coaction with said rotatable armature structure, said rotatable armature structure being driven by the electro-magnetic drag between it and said driven field, resulting from the co-action of both generated currents in producing magnetic flux.

14. In an automobile, the combination of a prime mover, a drive shaft and variable speed gear mechanism for said shaft, of an electric current generator having a fixed element, a driving rotatable element and a driven rotatable element, the driving rotatable element being driven by the prime mover to generate current through coaction with said fixed element and to generate current through coaction with the driven rotatable element to drive said driven rotatable element by the electromagnetic drag produced through the generation of said current, a shaft section carrying said driven rotatable element and split from the drive shaft, means to set said gear mechanism in operative relation to said driven element to drive the drive-shaft therethrough at variable speeds and means to set said gear mechanism in operative relation to said prime mover to drive the drive shaft therethrough at the same or at speeds variable to the speed of the prime mover.

15. In an automobile, the combination with a prime mover, of an electric current generator having three elements, two of said elements being relatively driven by the prime mover to generate current, the third element generating current through co-action with said relatively driven elements and being driven by said relatively driven elements through the electro-magnetic drag produced by the generation of said current by said third element, a driven shaft section carrying said third element, a continuing shaft section connected to the automobile wheels and split from said driven shaft section, means to couple the said shaft sections to one another, means to couple said driven shaft section to the prime mover, a variable speed mechanism and means for driving the continuing shaft section through the same from the said driven shaft section when driven magnetically or directly.

16. In an automobile, the combination with a prime mover, of an electric current generator having three elements, two of said elements being relatively driven by the prime mover to generate current, the third element generating current through coaction with said relatively driven elements and being driven by said relatively driven elements through the electro-magnetic drag produced by the generation of said electric current by said third element, to drive the automobile, and means to regulate the amount of current generated by said third element.

17. In an automobile, the combination with a prime mover, of an electric current generator having three elements, two of said elements being relatively driven by the prime mover to generate current, the third element generating current through coaction with said relatively driven elements and being driven by said relatively driven elements through the electro-magnetic drag produced by the generation of current in said third element, circuits for seriesing the windings of all three elements, a closer for said circuits operating with variable resistance to regulate the amount of current generated by said three elements, to drive the automobile at a speed proportional to the amount of current generated.

18. In an automobile, the combination with a prime mover, of an electric current generator having three elements, two of said elements being relatively driven by the prime mover to generate current, the third element generating current through coaction with said relatively driven elements and being driven by said relatively driven elements through the electromagnetic drag produced by the generation of current in said third element, a circuit connecting said relatively driven elements, a circuit for said third element, closing means for each of said circuits coöperating with variable resistance to regulate the amount of current generated by the relatively driven elements and to regulate the amount of current generated by said third element, to drive the automobile at a speed proportional to the amount of current generated by said elements.

19. In an automobile, the combination with a prime mover, of an electric current generator having three elements, two of said elements being relatively driven by the prime mover to generate current, the third element generating current through coaction with said relatively driven elements and being driven by said relatively driven elements through the electro-magnetic drag produced by the generation of electric current through its coaction with said relatively driven elements, a circuit with variable resistance connecting said relatively driven elements, a circuit closing means operating with variable resistance to short circuit said third element to control the amount of current generated by said third element.

20. In an automobile, the combination with a prime mover and a drive shaft, of an electric current generator having two armature structures with windings and a field structure with windings, said field structure and windings and one of said armature structures and windings being relatively driven by the prime mover to generate current, the other of said armature structures and windings generating current through coaction with said relatively driven armature and field structures and being driven through electro-magnetic drag produced by its generation of electric current through its coaction with said relatively driven field and armature, to drive the automobile, and means to regulate the amount of current generated by said latter armature.

21. In an automobile, the combination with a prime mover of a generator having a fixed armature structure with windings, a rotatable field structure with windings and a rotatable armature structure with windings, said field structure and windings being driven by the prime mover to generate current through coaction with said fixed armature structure and windings and to generate current through coaction with said rotatable armature structure and windings, said rotatable armature structure being connected to the load and being driven by the electro-magnetic drag produced through the generation of said current, to drive the automobile at a speed proportional to the amount of current generated, circuits for connecting either the windings of all three elements together, or the windings of the driven field structure and stationary armature structure together and for short circuiting the windings of the rotatable armature structure, and a closer for said circuits coöperating with variable resistance.

22. In an automobile, the combination with a prime mover, a drive shaft and variable speed mechanism for said shaft, of an electric current generator having a driving element operated by said prime mover, a driven element coacting with the driving element to generate current and being driven by the driving element through electro-magnetic drag produced by the generation of said current, a shaft section carrying said driven element and split from said drive shaft, means to set said prime mover or driving element in operative relation to said variable speed mechanism to operate the drive shaft at speeds variable to the speed of the prime mover, means to set said driven element in operative relation to said variable speed mechanism to drive the drive-shaft at speeds variable to the speed of the driven element to drive the automobile at variable speeds and reverse and means for coupling the drive shaft either to the driven element or to the prime mover to drive the shaft at the same speed as said prime mover or said driven element at will.

23. In an automobile, the combination with a prime mover, a drive shaft and variable speed mechanism for said shaft, of an electric current generator having three elements, two of said elements being relatively driven by said prime mover to generate current, the third element generating current through coaction with said relatively driven elements and being driven by the electro-magnetic drag produced through the generation of said current, means to set the prime mover or said third element in operative relation to said shaft to drive said shaft at the speed of the prime mover or said third element, means for driving said shaft through the variable speed mechanism from said prime mover and from said third element to drive said shaft at speeds variable to the speed of the prime mover or said third element, to drive the automobile at variable speeds and reverse.

24. In an automobile, the combination with a prime mover, a driving shaft, an intermediate shaft and a driven shaft, of an electric current generator having a driving element connected to said driving shaft and operated by said prime mover, and a driven element connected to the intermediate shaft and coacting with the driving element to generate current and being driven by the driving element through electro-magnetic drag produced through the generation of said current, and a variable speed gear mechanism comprising a countershaft with gears and a gear thereon in constant mesh with a gear on said intermediate shaft, means for coupling the driven shaft directly to the intermediate shaft and means for coupling the intermediate shaft directly to the driving element to drive said intermediate shaft directly from the prime mover whereby the driven shaft may be operated at speeds the same as or variable to the speed of either the prime mover or the magnetically driven element.

25. In an automobile, the combination with a prime mover, and a drive shaft, of an electric current generator having two armature structures with windings and one field structure with windings common to both said armature structures, said field structure and one of said armature structures being relatively driven by the prime mover to generate electric current, and the other of said armature structures generating current through coaction with said relatively driven armature and field and being rotated by the electro-magnetic drag produced through the generation of said current, to drive said shaft.

26. In an automobile, the combination with a prime mover, of an electric current generator having one fixed element and two rotatable elements, one of the rotatable elements being driven by the prime mover to generate current through coaction with the fixed element and to generate current through coaction with the other rotatable element which element is caused to rotate through electro-magnetic drag produced through the generation of said current and intensified by the action of the current generated through co-action with the fixed element to drive the automobile.

27. In an automobile, the combination with a prime mover, of an electric current generator having a fixed armature structure with windings, a concentric rotatable field structure with windings located within said armature and a concentric rotatable armature structure with windings located within said field structure, said field being driven by the prime mover to generate current through coaction with said fixed armature and to generate current through coaction with said rotatable armature and to rotate said inner armature through electro-magnetic drag produced by the generation of said current, and intensified or maintained as to its magnetic flux by means of the current of the fixed armature structure.

28. In an automobile, the combination with a prime mover, a drive shaft and variable speed mechanism for said shaft, of an electric current generator having three elements, two of said elements being relatively driven by the prime mover to generate current, the third element coacting with said relatively driven elements to generate current and being rotated by the electro-magnetic drag produced between it and said relatively driven elements through the generation of said current, means to set said variable speed mechanism in operative relation to said third element to drive said shaft therefrom at variable speeds, and means to set said mechanism in operative relation to said prime mover to drive said shaft therefrom at variable speeds, circuits connecting said relatively driven elements, circuits for said third element, closing means for each of said circuits and variable resistance for each of said circuits to regulate the amount of current generated by the relatively driven elements and to regulate the amount of current generated by the third element.

29. In an automobile, the combination with a prime mover, of an electric current generator having a fixed element, a driving rotatable element and a driven rotatable element, the driving rotatable element being driven by the prime mover to generate current through co-acting with said fixed element and to generate current through co-acting with the driven rotatable element to drive the driven element by the electro-magnetic drag produced through the generation of said current, to drive the automobile, and means for connecting said elements electrically in series.

30. In an automobile, the combination with a prime mover, of an electric current generator having a fixed element, a driving rotatable element and a driven rotatable element, the driving rotatable element being driven by the prime mover to generate current through co-acting with said fixed element and to generate current through co-acting with the driven rotatable element to drive the driven element by the electro-magnetic drag produced through the generation of said current, to drive the automobile, and means for closing the circuit of the driven rotatable element on itself during generation of current by the co-action of the driving rotatable element and the fixed element.

31. In an automobile, the combination with a prime mover, of an electric current generator having a fixed element, a driving rotatable element and a driven rotatable element, the driving rotatable element being driven by the prime mover to generate current through co-acting with said fixed element and to generate current through co-acting with the driven rotatable element to drive the driven element by the electro-magnetic drag produced through the generation of said current, to drive the automobile, the electric energy so generated in the fixed element being applied to intensify or maintain the electro-magnetic flux as and for the purpose described.

32. In an automobile, the combination with a prime mover, of an electric current generator having a fixed element, a driving rotatable element and a driven rotatable element, the driving rotatable element being driven by the prime mover to generate current through co-acting with said fixed element and to generate current through co-acting with the driven rotatable element to drive the driven element by the electro-magnetic drag produced through the generation of said current, to drive the automobile, the electric current generated in the fixed element being applied to intensify or maintain the magnetic flux and means for regulating said intensifying current to vary the drag.

33. In an automobile, the combination with a prime mover and a drive shaft, of an electric current generator having two armature structures with windings and a field structure with windings, said field structure and windings and one of said armature structures and windings being relatively driven by the prime mover to generate current, the other of said armature structures and windings generating current through co-action with said relatively driven armature and field structures and being driven through electro-magnetic drag produced by its generation of electric current through its co-action with said relatively driven field and armature, to drive the automobile.

Signed at the city of New York, in the county of New York, and State of New York, this 25th day of March, A. D. 1916.

MERION J. HUGGINS.

Witnesses:
CHAS. W. LA RUE,
B. ROMAN.